Dec. 10, 1929.                    B. T. LEVEQUE                    1,739,242
                                 DRIVING MECHANISM
                            Original Filed Feb. 2, 1924
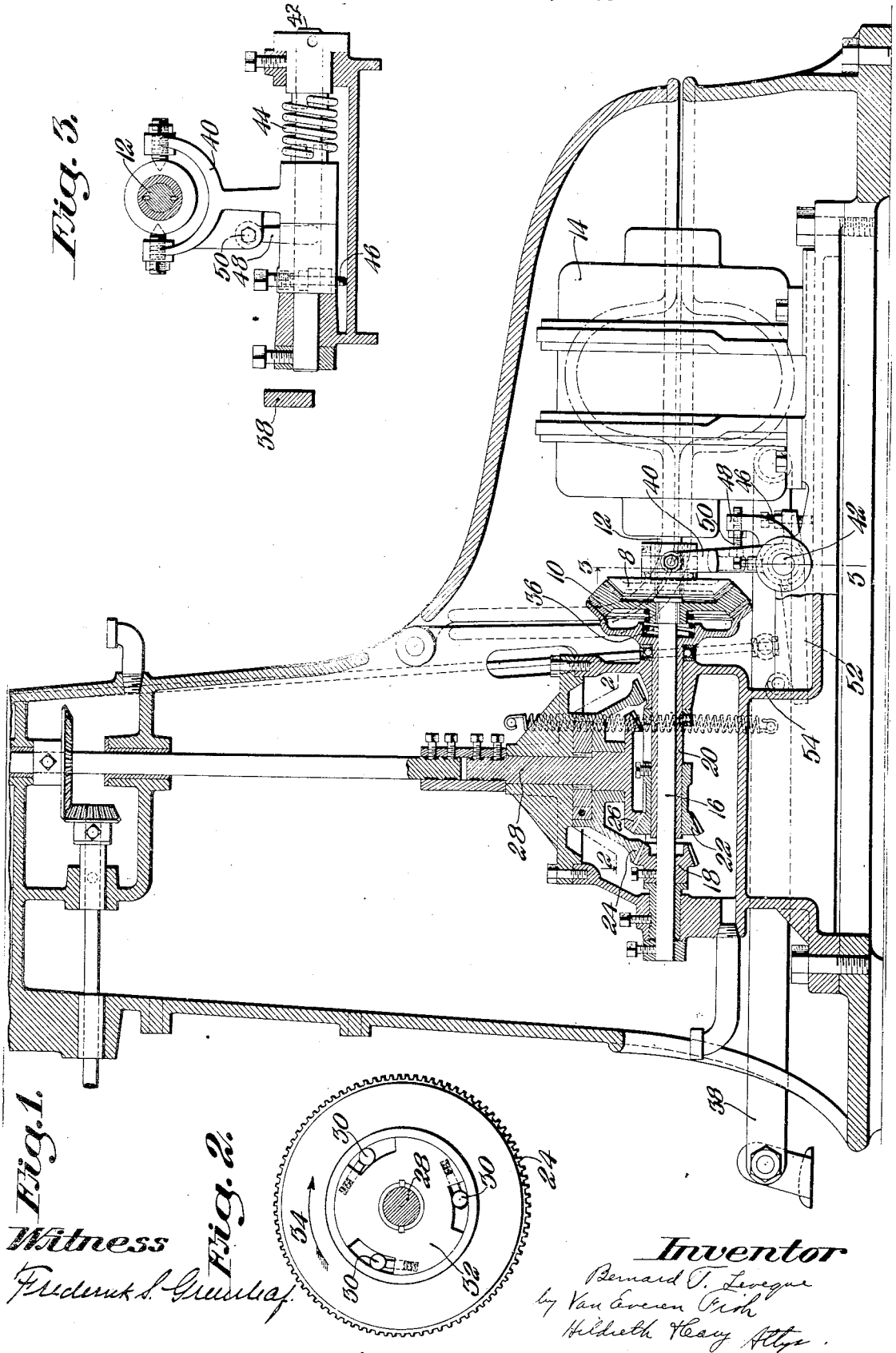
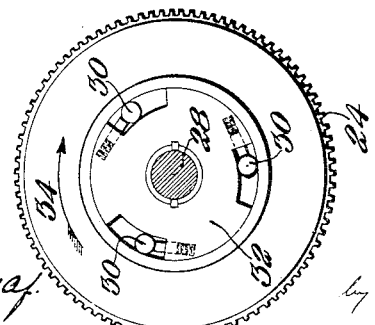

Patented Dec. 10, 1929

1,739,242

UNITED STATES PATENT OFFICE

BERNARD T. LEVEQUE, OF WENHAM, MASSACHUSETTS, ASSIGNOR TO UNITED SHOE MACHINERY CORPORATION, OF PATERSON, NEW JERSEY, A CORPORATION OF NEW JERSEY

DRIVING MECHANISM

Original application filed February 2, 1924, Serial No. 690,265. Divided and this application filed October 19, 1925. Serial No. 63,227.

This invention relates to variable speed drive mechanism and while particularly designed for application to shoe sewing machines in not limited thereto.

The object of the present invention is to produce a novel and improved two-speed driving mechanism adapted to operate sewing or other machines, which is simple and durable in construction and reliable in operation.

With these objects in view the invention consists in the devices, combinations and arrangement of parts hereinafter described and claimed which, while designed particularly for use in connection with sewing machines, are also capable of use in connection with other machines.

The several features of the present invention and the advantages attained thereby will be readily understood by those skilled in the art from the following description taken in connection with the accompanying drawings which illustrate the several features of the invention.

Fig. 1 is a sectional elevation of the driving mechanism housed in the base of a McKay sole shoe sewing machine; Fig. 2 is a detail plan view taken on the line 2—2 of Fig. 1; and Fig. 3 is a detail sectional view taken on the line 3—3 of Fig. 1.

For a detailed description of the complete machine to which the present invention has been applied reference may be had to the applicant's pending application Serial No. 690,265, filed February 2, 1924, of which the present application is a division.

The driving mechanism of the machine is a two speed mechanism and comprises two friction cone clutches indicated at 8 and 10. The clutch 8 is splined upon the shaft 12 of an electric motor 14 secured to the base of the machine within the hollow column, and the clutch 10 is splined upon a shaft 16 journaled in the base of the machine within the hollow column in line with the shaft 12. A bevel gear 18 is fast upon the shaft 16 and mounted to rotate on the shaft is a sleeve 20 to which is secured a bevel gear 22. The bevel gears 18 and 22 mesh respectively with bevel gears 24 and 26, of which the gear 26 is formed on or secured to a vertical shaft 28, and of which the gear 24 is journaled upon the shaft 28. A Horton clutch connects the gear 24 with the shaft 28. This clutch is shown in detail in Fig. 2, the spring pressed clutch balls being indicated at 30 and the clutch disk which is secured to the shaft 28 being indicated at 32. As will be obvious this construction permits the shaft 28 to be driven by the gear 24 in the direction of the arrow 34 and also permits the shaft 28 to be driven ahead of the gear 24 in the same direction. The cone clutch 10 is acted upon by a spring 36 which tends to hold it in its extreme position to the right as viewed in Fig. 1, the movement of the clutch being limited by a flange on the end of the shaft 16. The cone clutch 8 is actuated through suitable connections from the treadle lever 38. A slight pressure on the treadle moves the cone clutch 8 into engagement with a cooperating clutching surface on the clutch member 10 and thus drives the shaft 16 and through the bevel gears 18 and 24 the vertical shaft 28. A continued pressure on the treadle moves both the clutch member 8 and the clutch member 10 toward the left, as viewed in Fig. 1, until the cone clutching surface of the member 10 engages a cooperating clutching surface on the sleeve 20. This causes the sleeve 20 and gear 22 fast thereon to rotate with the shaft 16 and gear 18 and through the bevel gear 26 to drive the shaft 28 at a higher rate of speed than the gear 24. Thus, when the gear 18 alone is in operation the machine is driven at a comparatively low speed and when both gears 18 and 22 are in operation the machine is driven at a high speed. Either of these speeds may be varied somewhat by varying the pressure applied to the foot treadle.

The connections between the cone clutch 8 and the foot treadle 38 comprise a clutch actuating yoke 40 engaging the hub of the clutch at its upper end and pivotally mounted at its lower end upon a pivot pin 42. The yoke 40 is acted upon by a spring 44 coiled around the pivot pin 42 and tending to move the clutch member 8 away from the clutch member 10. This movement of the yoke 40 is limited by an adjustable stop screw 46 mounted in an arm extending from the hub of the yoke. To the pivot pin 42 is secured an arm 48 provided with a set screw 50 arranged to engage the yoke 40. To the pivot pin 42 is also secured an arm 52 which extends beneath a roll 54 mounted upon the treadle lever 38 in such position that a depression of the treadle lever depresses the arm 52 and through the pivot pin 42, arm 48 and yoke 40 moves the clutch member 8 towards the member 10.

The shaft 28 is directly coupled to a vertical shaft which through bevel gears drives the sewing cam shaft of the machine.

The nature and object of the invention having been indicated and the driving mechanism embodying the invention housed in a shoe sewing machine of the McKay type having been described, what is claimed is:

1. A two speed driving mechanism for sewing and other machines comprising a power shaft, a driven shaft at an angle to the power shaft, an intermediate shaft in line with said power shaft, a sleeve mounted on said intermediate shaft, two sets of gears connecting the driven shaft with the intermediate shaft and sleeve, a one way clutch between one of said sets of gears and the driven shaft to permit the driven shaft to rotate ahead of said gears, and means for clutching the intermediate shaft to the power shaft or for clutching the intermediate shaft and sleeve to each other and to the power shaft.

2. A two speed driving mechanism for sewing and other machines comprising a power shaft, a driven shaft, an intermediate shaft, a sleeve mounted on the intermediate shaft, two sets of gears connecting the driven shaft with the intermediate shaft and the sleeve, a one way clutch in one of said sets of gears to permit the driven shaft to rotate ahead of said gears, a friction member mounted on the power shaft, a friction clutch member on the sleeve, an intermediate friction clutch member between said clutch members, and a treadle and suitable connections for moving the clutch member on the power shaft into engagement with the intermediate clutch member and thereafter the intermediate clutch member into engagement with the clutch member on the sleeve.

In testimony whereof I have signed my name to this specification.

BERNARD T. LEVEQUE.